United States Patent [19]

Ives

[11] Patent Number: 4,617,209
[45] Date of Patent: Oct. 14, 1986

[54] MOLDED END CAP FOR EXTRUDED TRIMS

[75] Inventor: Albert G. Ives, Solon, Ohio

[73] Assignee: LOF Plastics Inc., Troy, Mich.

[21] Appl. No.: 689,792

[22] Filed: Jan. 8, 1985

[51] Int. Cl.$^4$ .............................................. B60R 13/04
[52] U.S. Cl. ...................................... 428/31; 52/716; 293/128; 428/60
[58] Field of Search ...................... 428/31, 60; 52/716; 293/128, 1

[56] References Cited

U.S. PATENT DOCUMENTS

| | | | |
|---|---|---|---|
| 3,359,030 | 12/1967 | Newman | 293/128 |
| 3,451,709 | 6/1969 | Swauger | 428/31 X |
| 3,493,257 | 2/1970 | Fitzgerald et al. | 428/315.9 X |
| 3,506,294 | 4/1970 | Newman | 428/31 X |
| 3,715,138 | 2/1973 | Finkle | 428/31 X |
| 3,843,475 | 10/1974 | Kent | 428/31 X |
| 3,914,482 | 10/1975 | Sawa et al. | 428/31 |
| 3,959,538 | 5/1976 | Loew | 428/31 |
| 4,066,285 | 1/1978 | Hall et al. | 428/31 X |
| 4,174,986 | 11/1979 | Jennings | 428/31 X |
| 4,181,764 | 1/1980 | Totten | 428/155 |

FOREIGN PATENT DOCUMENTS 1950412  4/1971  Fed. Rep. of Germany ........ 428/31

Primary Examiner—Henry F. Epstein
Attorney, Agent, or Firm—Phillip S. Oberlin

[57] ABSTRACT

An injection molded end cap for attachment to the terminal end of an extrusion. The end cap includes a projecting skirt which cooperates with a complimentary upper surface of the extrusion for producing a gentle transition and covering a junction therebetween. The abutting ends between end cap and terminal end of the extrusion may be secured to each other by heat sealing, adhesives, and the like.

3 Claims, 3 Drawing Figures

MOLDED END CAP FOR EXTRUDED TRIMS

BACKGROUND OF THE INVENTION

This invention generally relates to extrusions used for protective and decorative trim strips and, more particularly, to molded end caps for finishing the terminal ends of such extrusions.

Protective and decorative trim strips are commonly used for enhancing the external appearance of automotive bodies, furniture and other types of articles, as well as protecting the associated article from accidental scratch producing contact. Conventionally, such trim strips are typically formed in a continuous fashion by an extrusion process employing a suitable extrudable material, such as an extrudable plastic. The continuous strip is thence severed into desired lengths to produce the desired individual trim strips.

Molded end caps have been used in the past for covering the ends of decorative trim strips produced from extrusions such as illustrated in U.S. Pat. Nos. 3,451,709, issued on June 24, 1969 and 3,843,475, issued on Oct. 22, 1974.

When trim strips, such as those used on the exterior of automotive bodies, are extruded from plastic materials, the cross-sectional tolerance of such plastic material tends to vary in size and the tolerance will change in accordance with the size of the extrusion. This change in cross-sectional tolerance of the plastic material produces a problem in that when a molded end cap is affixed to the end of such an extrusion, the variation in tolerance makes it appear that the end cap is either too large or too small for the extrusion.

SUMMARY OF THE INVENTION

The aforementioned problem is overcome by designing a molded end cap with a projecting flexible skirt. More specifically, the flexible skirt of the end cap is sized to the largest tolerance of the associated extrusion. Thereby, the flexible skirt, extending from the upper edge of the abutting end of the cap, overlies the top surface of the associated extrusion. In such use, the projecting skirt is adpated to flex and fit relatively tightly against the end of the associated extrusion and form a gentle transition between the end cap and the extrusion effectively disguising any difference in size between the two members. The skirt also covers the joint between the end cap and the extrusion and not only improves the appearance, but protects the joint from adverse conditions caused by weathering, water, dirt, and the like.

An object of the invention is to produce an injection molded end cap for an extrusion that will accommodate the normal dimensional fluctuations in the cross-section of the extrusion, and result in an aesthetically pleasing appearance.

BRIEF DESCRIPTION OF THE DRAWING

The above as well as other objects of the invention will become readily apparent to one skilled in the art from reading the following detailed description of a preferred embodiment of the invention when considered in light of the accompanying drawing in which.

DESCRIPTION OF THE PREFERRED EMBODIMENT

Figure 1:
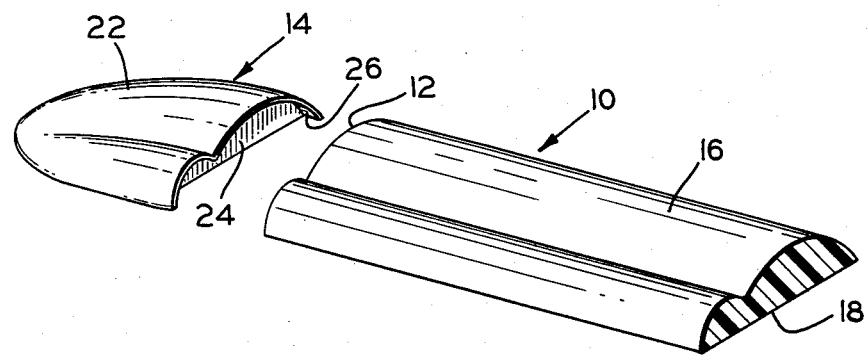
FIG. 1 is an exploded perspective view of a trim strip and molded end cap embodying the invention.

Referring to the drawing, particularly FIG. 1, there is illustrated a portion of a decorative trim strip for the exterior of an automotive body including an elongate extrusion 10 having a terminal end 12, and an associated molded end cap 14 constructed in accordance with the invention. The extrusion 10 includes a suitably shaped upper surface 16 and a flat bottom surface 18. It should be noted that many styling versions can be employed for the upper surface 16 and that one shown is for illustrative purposes only.

Figure 2:
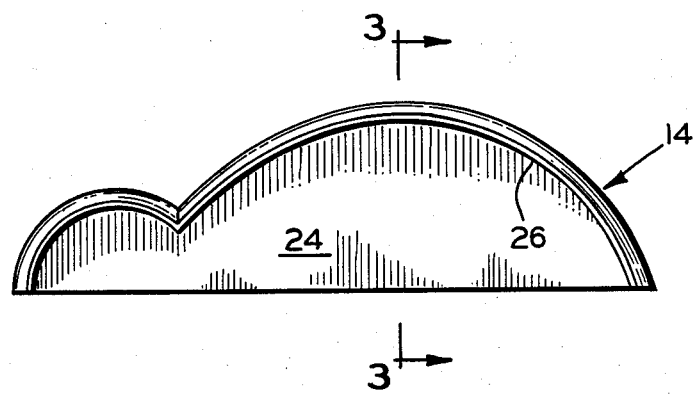
FIG. 2 is an enlarged end elevational view of the cap illustrating the end of the cap abutting the terminal end of the extrusion.
Figure 3:
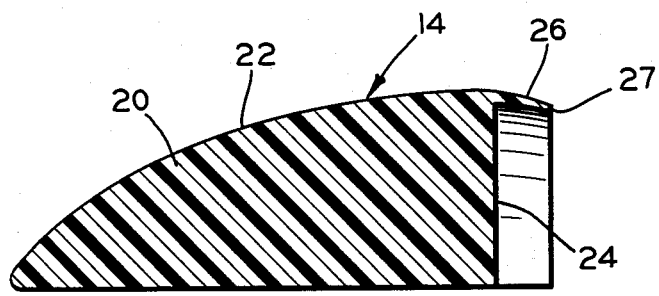
FIG. 3 is an enlarged longitudinal sectional view taken substantially along line 3—3 of FIG. 2.

Referring now to FIGS. 2 and 3, the end cap 14 includes a body portion 20 having a top surface 22 which smoothly merges and blends in a flared curve to a point of maximum cross-sectional area. The body portion 20 also includes a terminal end 24 which is similarly shaped in size and transverse cross-section to be substantially the same as that of the terminal end 12 of the extrusion 10. Typically, the terminal end 24 abuts the terminal end 12 of the extrusion 10 when assembled.

As best illustrated in FIG. 3, an integral skirt 26 is adapted to project from the top edge of the terminal end 24. The projecting skirt 26 is similarly shaped in transverse cross-section to the shaped upper surface 16 of the extrusion 10 for effectively overlying and conforming to the surface 16. Preferably, the skirt 26 is flexible so as to fit relatively tightly against the surface 16 to produce an aesthetically gentle transition between the extrusion 10 and the end cap 14, as well as to militate against the admission of any foreign particulate or fluid contaminants into the joining surfaces. Also, it will be appreciated that the flexible skirt 26 is able to accommodate undersized as well as oversized extrusions 10 since, as shown in FIG. 3, the skirt 26 is bent inwardly to define a terminal end 27 which is smaller than a terminal end 12 of an extrusion 10 of nominal size. Thus, the skirt 26 will conform to and engage an undersized extrusion 10, and be deflected outwardly to conform to an oversized extrusion 10.

As illustrated in the drawings, the skirt may be tapered in thickness toward its terminal end 27 to provide additional flexibility and to further disguise the transition between the end cap and the extrusion 10.

If desired, the end cap 14 may be fixedly secured to the terminal end of the extrusion 10 by various means (not shown) such as by heat sealing, adhesives, mechanical fasteners, and the like. In this respect, excellent results have been obtained by directly injection molding the end cap onto the extrusion.

It has been found that satisfactory results have been achieved by forming the extrusion 10 and the end cap 14 from a plastic material such as for example polyvinyl chloride.

In accordance with the provisions of the Patent Statutes, the principle and mode of operation of the invention has been explained and what is considered to represent its preferred embodiment has been illustrated and described. It should, however, be understood that the invention may be practiced otherwise than as specifically illustrated and described without departing from its spirit and scope.

I claim:

1. A decorative trim strip attachable to an underlying surface of a substrate, comprising:

an elongate extrusion having at least one terminal end and including an upper longitudinally extending shaped surface, said upper shaped surface in cross-section having a flat bottom surface;

an end cap for attachment to the terminal end of said extrusion and constructed to accommodate both an undersized and oversized extrusion, said end cap including a body having a terminal end which is sized and shaped to conform to the size and shape of the terminal end of said extrusion, the terminal end of said end cap having a flexible skirt projecting from the upper edge thereof which extends over and contacts the upper shaped surface of said extrusion;

said flexible skirt being bent inwardly to conform to said undersized extrusion and being adapted to be flexibly deflected outwardly to conform to said oversized extrusion; and means for securing said end cap and said extrusion to an underlying surface of a substrate wherein the skirt produces a smooth transition between said end cap and said extrusion.

2. The invention defined in claim 1 wherein the skirt projecting from said end cap is shaped the same as the upper surface of said extrusion.

3. The invention defined in claim 2 wherein said skirt is tapered in thickness toward its terminal end.

* * * * *